United States Patent
Rajendran et al.

(10) Patent No.: US 8,792,936 B2
(45) Date of Patent: Jul. 29, 2014

(54) ESTABLISHING COMMUNICATION BETWEEN DEVICES USING CLOSE PROXIMITY PROTOCOL

(71) Applicant: Xerox Corporation, Norwalk, CT (US)

(72) Inventors: Premkumar Rajendran, Webster, NY (US); Gavan L. Tredoux, Penfield, NY (US); Peter J. Zehler, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 145 days.

(21) Appl. No.: 13/632,323

(22) Filed: Oct. 1, 2012

(65) Prior Publication Data

US 2014/0094117 A1    Apr. 3, 2014

(51) Int. Cl.
*H04M 1/00* (2006.01)

(52) U.S. Cl.
USPC ........ 455/552.1; 455/410; 455/411; 455/418; 455/420; 455/41.1; 455/41.2; 455/553.1; 455/556.1; 455/556.2; 455/557; 340/539.1; 340/539.22; 340/539.23; 340/13.24; 340/13.25; 340/13.26

(58) Field of Classification Search
USPC .............. 455/410, 411, 418, 420, 41.1, 41.2, 455/552.1, 553.1, 556.1, 556.2, 557, 574, 455/343.1, 343.2, 343.3; 340/539.1, 340/539.13, 539.22, 539.23, 539.26, 539.3, 340/572.1, 13.24, 13.25, 13.26
See application file for complete search history.

(56) References Cited

U.S. PATENT DOCUMENTS

| | | | |
|---|---|---|---|
| 6,032,004 A | 2/2000 | Mirabella, Jr. et al. | |
| 7,519,325 B2 | 4/2009 | Wakim | |
| 7,986,917 B2 * | 7/2011 | Ahlgren et al. | 455/41.2 |
| 8,014,722 B2 | 9/2011 | Abel et al. | |
| 8,095,113 B2 | 1/2012 | Kean et al. | |
| 8,280,306 B2 * | 10/2012 | Oba et al. | 455/41.2 |
| 8,345,881 B2 * | 1/2013 | Rekimoto | 380/282 |
| 8,422,948 B2 * | 4/2013 | Griffin et al. | 455/41.1 |
| 2008/0039212 A1 * | 2/2008 | Ahlgren et al. | 463/46 |
| 2008/0153540 A1 * | 6/2008 | Brown | 455/550.1 |
| 2009/0143104 A1 | 6/2009 | Loh et al. | |
| 2009/0191811 A1 | 7/2009 | Griffin et al. | |
| 2011/0185183 A1 | 7/2011 | Yamamoto | |
| 2011/0210831 A1 | 9/2011 | Talty et al. | |
| 2011/0275316 A1 | 11/2011 | Suumaki et al. | |
| 2011/0320243 A1 | 12/2011 | Khan | |
| 2012/0034867 A1 * | 2/2012 | Griffin et al. | 455/41.1 |
| 2012/0036441 A1 * | 2/2012 | Basir et al. | 715/734 |
| 2012/0040610 A1 | 2/2012 | Moosavi et al. | |
| 2012/0071087 A1 * | 3/2012 | Griffin et al. | 455/41.1 |
| 2012/0100803 A1 | 4/2012 | Suumaki et al. | |

\* cited by examiner

*Primary Examiner* — Tuan A Tran
(74) *Attorney, Agent, or Firm* — Gibb & Riley, LLC (57) ABSTRACT

Methods and devices detect a near field communication (NFC) from a near field wireless communication device of an external computerized device, using an apparatus near field wireless communication device. Based on detecting the NFC, the methods/devices generate random identification and security codes, transmit the identification code and the security code from the apparatus near field wireless communication device to the device near field wireless communication device, and place the previously inactive apparatus wide-range wireless communication device in an active state. In response, the method receives the security code from a wide-range wireless communication device of the external computerized device using the apparatus wide-range wireless communication device. Then the method establishes a network communication session only between the external computerized device and the apparatus based on receiving the security code.

24 Claims, 6 Drawing Sheets

ESTABLISHING COMMUNICATION BETWEEN DEVICES USING CLOSE PROXIMITY PROTOCOL

BACKGROUND

Embodiments herein generally relate to devices and methods of establishing wireless communications between devices to establish network communication sessions.

Establishing connectivity between devices, for example mobile devices and multi-function printing devices (MFDs) often requires difficult setup steps, in which one device (say the mobile device) needs to be configured with the networking details of the other device (say the MFD). Users who are in transit may not have these details preconfigured when they want to make the connection. The device they connect to may often want, for security reasons, to severely restrict that connectivity to only use of the device itself. The MFD may offer a peer-to-peer (direct) onboard wireless connection, such as Bluetooth or 802.11x, to the mobile for this purpose, but the problem remains that is it hard to setup this connection securely, especially in the presence of multiple MFDs with similar capability, whose competing wireless signals may also cause interference and confusion.

SUMMARY

An exemplary method herein maintains (using a processor of an apparatus) a "wide-range" wireless communication device of the apparatus in an inactive state and a "near field" wireless communication device of the apparatus in an active state when no communications are received from any external devices (that are external to the apparatus). The apparatus near field wireless communication device and the apparatus wide-range wireless communication device use different communication mediums.

For example, the apparatus may be connected to a computerized network, but an external computerized device may not be connected to the computerized network, and communications will need to be established between the two. Therefore, this exemplary method detects a near field communication (NFC) from a near field wireless communication device of the external computerized device, using the apparatus near field wireless communication device. The apparatus and the external computerized device may operate under a coordinated set of communication protocol instructions stored in non-transitory storage mediums of the apparatus and the external computerized device.

In one simplified example, the apparatus near field wireless communication device and the external device near field wireless communication device may be able to only communicate over distances less than 1 meter. For example, the detection of the NFC from the external device near field wireless communication device may only occur when the external computerized device is positioned within 0.1 meter of the apparatus near field wireless communication device. To the contrary, the apparatus wide-range wireless communication device and the external device wide-range wireless communication device can communicate over distances less than and greater than 1 meter.

Based on detecting the NFC from the external computerized device (and based on the coordinated set of communication protocol instructions) the method generates random identification and security codes using the processor, transmits the identification code and the security code from the apparatus near field wireless communication device to the device near field wireless communication device, and maintains the apparatus wide-range wireless communication device in an active state using the processor.

The inactive state of the apparatus wide-range wireless communication device can be a non-transmitting or non-receiving state, and/or a powered-down state. The active state of the apparatus wide-range wireless communication device is a state where the apparatus wide-range wireless communication device is powered-on and receives communications made using the identification code.

In response, the method receives the security code from a wide-range wireless communication device of the external computerized device (based on the coordinated set of communication protocol instructions) using the apparatus wide-range wireless communication device. Then, the method establishes a network communication session only between the external computerized device and the apparatus, using only the apparatus wide-range wireless communication device and the external device wide-range wireless communication device, based on receiving the security code and based on the coordinated set of communication protocol instructions (using the processor).

Different identification codes and different security codes are randomly generated for each different network communication session, making each different identification code and each different security code unique for each the different network communication sessions. Different communication sessions are formed between the apparatus and each different external device. Each network communication session is based on the coordinated set of communication protocol instructions. The method can also set a time limit (lease period) for the network communication session and the processor terminates the network communication session based on the time limit expiring, requiring the external computerized device to form a new network communication session.

An exemplary apparatus herein may include many elements such as a processor, a communications port, etc., all of which may be operatively (directly or indirectly) connected to the processor. An apparatus near field wireless communication device may be operatively connected to the processor. Further, such a device can include an apparatus wide-range wireless communication device operatively connected to the processor. The apparatus near field wireless communication device and the apparatus wide-range wireless communication device use different communication mediums The processor maintains the apparatus wide-range wireless communication device in an inactive state (off or at least not transmitting or receiving) and the apparatus near field wireless communication device in an active state where there are no communications received from any external devices (that are external to the apparatus).

The apparatus near field wireless communication device detects a near field communication (NFC) from an external device near field wireless communication device of an external computerized device. The apparatus and the external computerized device operate under a coordinated set of communication protocol instructions stored in respective non-transitory storage mediums of the apparatus and the external computerized device.

Based on the detection of the NFC from the external computerized device (and based on the coordinated set of communication protocol instructions) the processor generates random identification and security codes, transmits the identification code and the security code from the apparatus near field wireless communication device to the device near field wireless communication device, and maintains the apparatus wide-range wireless communication device in an active state. The active state of the apparatus wide-range wireless communication device set in this process is a state where the apparatus wide-range wireless communication device receives communications made using the identification code.

The apparatus wide-range wireless communication device then receives the security code from an external device wide-range wireless communication device of the external computerized device (that is based on the coordinated set of communication protocol instructions). This allows the processor to establish a network communication session only between the external computerized device and the apparatus (using only the apparatus wide-range wireless communication device and the external device wide-range wireless communication device) based on the receipt of the security code and based on the coordinated set of communication protocol instructions.

Different identification codes and different security codes are generated for each different network communication session between the apparatus and different ones of the external devices, based on the coordinated set of communication protocol instructions, making each different identification code and each different security code unique for each of the different network communication sessions. The processor can also set a time limit for the network communication session and the processor terminates the network communication session when the time limit expires.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

As mentioned above, the methods and devices herein connect two network-capable devices, say a mobile device with a MFD. A mobile device can be used to print documents directly to MFD or scan documents from the MFD, or perform other operations. For example, a user may wish to print a document, which might already be stored on the mobile device, at a printing kiosk when in transit, say at an airport. Likewise the user may wish to scan from the MFD to the mobile. In order to communicate, a network link needs to be set up between the two devices, with enough bandwidth to carry potentially sizable job data between the two devices. Since most mobile devices already have built in support for wireless protocols such as 802.11x and Bluetooth, these are natural candidates for making that connection. The discussion below is framed in terms of 802.11x WiFi, but the same principles apply to Bluetooth and any other communications protocol whether currently known or developed in the future.

The discussion also uses MFDs and mobile devices as example devices, but the same discussion applies to any two devices wishing to communicate. Likewise, while near field communications (NFC) is used as an example of a close physical proximity protocol, and protocol with similar characteristics is also comprehended.

One issue is that MFDs and mobile devices often reside on different networks. This difference makes a direct connection between MFD and mobile hard to accomplish. In one scenario, a user with a mobile device may want to connect to an MFD, but the two may be on separate networks. In some situations the user may be able to connect to a local wireless access point, which grants the user access to the MFD, if the MFD is on the same network as the access point. However, this typically requires credentials for accessing that network, not to mention prior knowledge of the configuration parameters required, and attendant risks that the user may be able to access other resources on that network, and not just the MFD itself. The devices and methods herein addresses those situations where this is not possible, because the user is only transiently present, is not a full-fledged member of the surrounding corporate network, is simply not able or prepared to do the required configuration of the mobile device, or doing so is not desirable for security reasons. The devices and methods herein enable a direct connection between the mobile and the MFD.

Using the mobile's built-in wireless capability is a cost-effective and readily implemented method for directly connecting the two devices. If the MFDs are equipped with an onboard wireless access point, the two can, in principle, be connected in the standard manner to form a 2-device ("peer to peer") network.

The following steps are involved for a mobile device to pair with the MFD via wireless. First, the MFD Receives communications made using a Wi-Fi signal with a preconfigured SSID (Service Set Identifier, a 32-character unique identifier that acts a password to connect to the Wi-Fi device, e.g. "PUBLICPRINTER"). The same SSID differentiates a particular Wi-Fi access point from others that are available, of which there may be many in any one location.

Secondly, a user with a mobile device who wants to connect to the MFD, searches through the list of available SSIDs. The user selects the appropriate one, only if he is aware of the SSID name that matches the MFD. Third, once the user identifies the SSID of the MFD, the user provides the credentials to connect to the identified MFD, along with the required protocol parameters (encryption method etc., often these are obscure in practice and vary widely between sites, they are also not obvious in many cases). Finally, once the mobile device is connected to the MFD, the user can start using the print or scan functionality of the MFD directly through his mobile device.

However, if a user is in transit, the user sees a list of locally available SSIDs his device discovers, but has to manually sort through the list and select the correct SSID corresponding to the intended MFD. It may not be obvious which SSID is the correct one to use, since there may be many MFDs in the area, each with its own onboard access point, not to mention the other access points which may be available, perhaps even in neighboring buildings.

Further, in principle, anyone within the MFD's Wi-Fi range can try to connect to the MFD, even if that person has no business with the MFD, and this range may extend to hundreds of feet, through building walls. The MFD thus faces certain security threats, just by advertising the Wi-Fi SSID, or by using an SSID, which may be guessed. Likewise, the user making the connection faces uncertainty in selecting the SSID. For example, the wrong SSID may be chosen, say one advertised by an imposter, and the mobile device may be exposed to attackers from that network. For this reason, wireless networks support encryption protocols, and may require credentials for clients to join them (though note that this alone does not address the issue of imposters). However, if the onboard wireless access point is secured in this way, a barrier is erected to its usage, since now that user has to have those credentials, and do the appropriate configuration. For one-off or occasional usage in transit, this can be an important obstacle, so that many users are deterred. It may simply be too difficult for them to do this, or hard for them to find out the required credentials, which ideally should change so that they do not become well-known.

Also, as mentioned above, a user who wants to access a MFD has to search through SSIDs and connect the appropriate one. Searching through the SSIDs requires MFD to broadcast its Wi-Fi channel and be available for connections, which requires the Wi-Fi to be turned on. Even if the MFD is not in use, the Wi-Fi device would be enabled. This is power wastage, which may add up over a fleet of devices.

In addition, every Wi-Fi access point uses a "channel" to communicate. When the number of access points increases, the channels get used up and interference may occur. Consider a building like an Airport, where there are many access points that are operating, including (say) arrays of MFDs each with its own access point. This interference reduces the quality of service of a Wi-Fi connection, including all the other wireless connections from other devices to other resources.

Therefore, the devices and methods herein enable on-demand establishment of a wireless connection between two devices, such as an MFD and a mobile. The MFD offering the wireless access point turns that access point off by default. By "touching" that device using a near field communication (NFC) protocol, a mobile device can exchange setup details with the MFD, causing the MFD to enable its wireless access point and permit a wireless connection. The connection can then be secured on multiple ways, by randomizing the network identifier (e.g. SSID) and creating one-time security credentials for the communication. Because this setup can be exchanged using the NFC protocol, which requires physical proximity, security is provided by the need to be close enough to the device to touch it, without requiring the user to type in tedious connection details. This gives significant security assurance with maximal usability.

Thus, the Wi-Fi is, by default, inactive on the MFD. Turning off the Wi-Fi ensures that Wi-Fi is not advertised. It is not publicly available, and when the user searches for the list of SSIDs locally available, it does not show up. This is the default state.

With the devices and methods herein, an NFC chip is incorporated on both the MFD device and the mobile device. NFC is a standard for establishing a very short-range, low-bandwidth inductive connection between devices by having one device "touch" or "tap" the other (within a few centimeters) as represented by item 101 in FIG. 1. In response to the establishment of an NFC connection with the MFD the user can be directed to a public site to install the required software application of instructions to establish a network communication session. Alternatively, the user could have pre-installed the application on their mobile device. The MFD has a similar software application onboard.

These two applications communicate over the NFC channel to implement the protocol described below, as represented by item 102 in FIG. 1. Thus, in item 102, the devices and methods herein generate a new wireless network configuration (containing a new random SSID, a one-off password to connect to the Wi-Fi network, and a fresh lease period). The MFD powers on the WiFi access point and listens for connections to the generated SSID.

Figure 1:
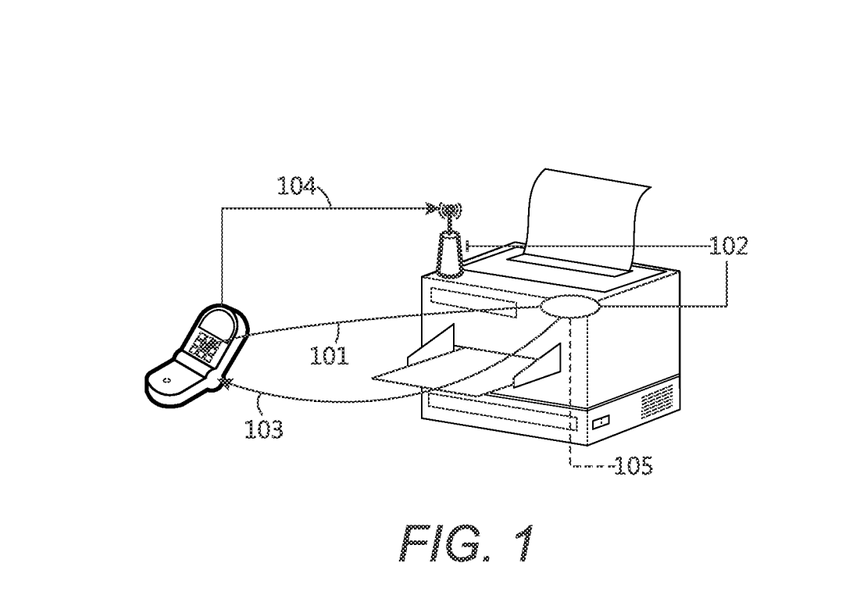
FIG. 1 is a schematic diagram of a device according to embodiments herein.

Item 103 in FIG. 1 the MFD shares the configuration with mobile application over the NFC channel. The NFC channel is very low bandwidth and cannot be used to exchange more than a small amount of data, especially given that the two devices have to be held close together for the duration of the exchange.

In item 104, the devices establish a Wi-Fi connection. Once the NFC shares data with the mobile device, the mobile application connects to the WiFi access point on the MFD. Using the SSID and the password and other security configuration for the Wi-Fi that was shared over the NFC connection above. Users can now scan or print to the MFD using a suitable printing or scanning application on their mobile, or perform whatever other operations are available. Item 105 in FIG. 1 points to the NFC chip in the MFD.

Figure 2:
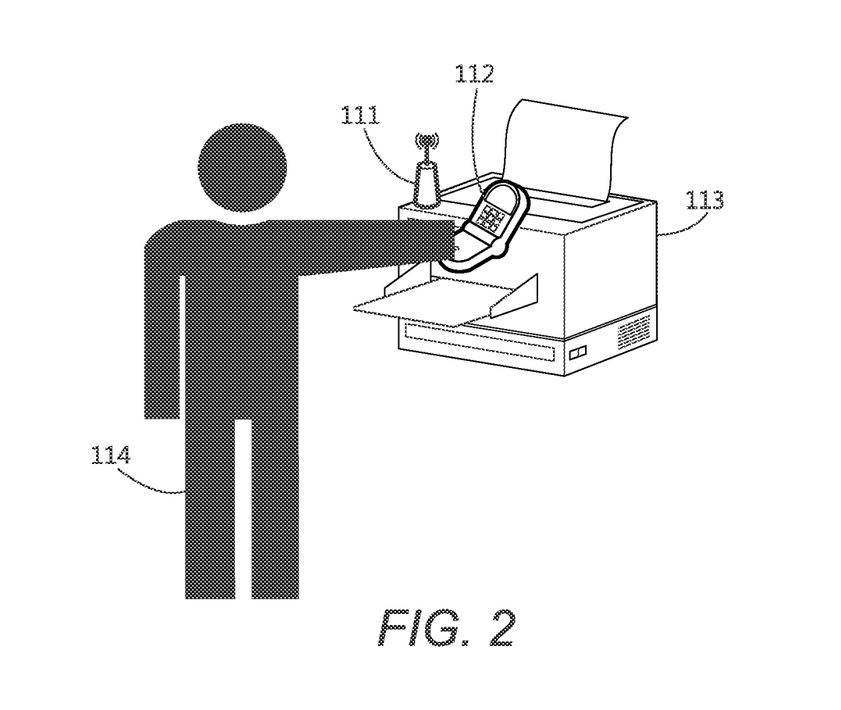
FIG. 2 is a schematic diagram of a device according to embodiments herein.
Figure 3:
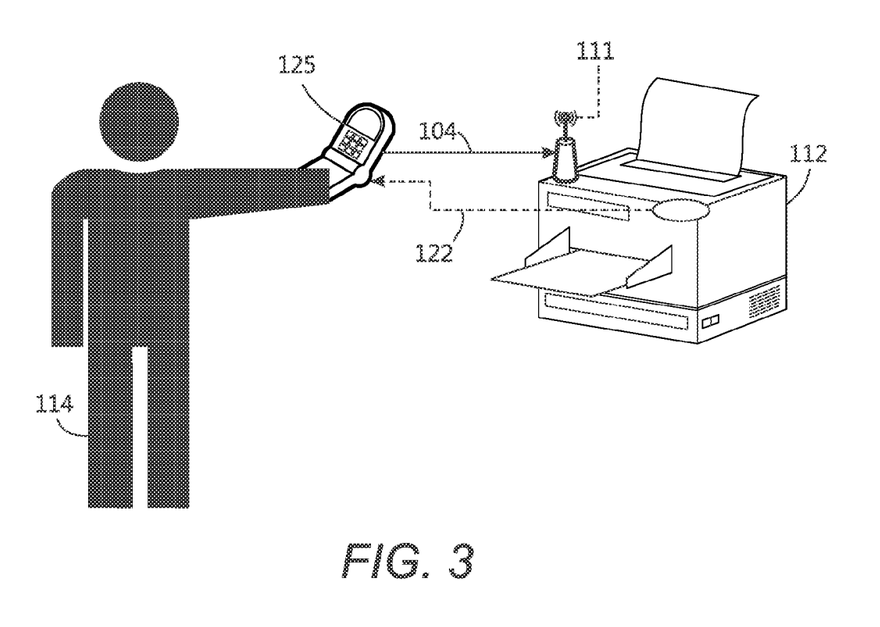
FIG. 3 is a schematic diagram of a device according to embodiments herein.

This process is also illustrated schematically in FIGS. 2 and 3. More specifically, in FIG. 2, item 113 represents the MFD with the NFC chip and item 114 represents the user. Item 111 represents that the WiFi is initially off. Item 112 shows the user 114 touching the mobile device against the area of the MFD that holds the NFC chip 105 (shown in FIG. 1).

In FIG. 3, item 112 again represents the MFD with the NFC chip and item 114 represents the user. Item 111 again represents that the WiFi is initially off. Item 122 represents that the NFC chip shares the generated configuration with the mobile device and turns the WiFi on. Item 104 again illustrates that, based on the shared configuration, the mobile device (through the software application, illustrated as item 125) connects to the MFD 112.

When the MFD generates the one-off WiFi configuration, it can also generate a lease period for the connection between the mobile and Wi-Fi device. The lease period determines how long the connection is valid. Once the lease period expires, the MFD terminates the WiFi connection and disables its WiFi access point. At this point the process must be repeated to re-establish a connection. If the lease period has not expired and a new user taps on the NFC chip on the MFD, the exiting connection is terminated and a new one established with a new one-off configuration.

In situations where direct physical proximity is not considered to be adequate security, an additional user-supplied credential may be required by the MFD, and may be exchanged at the initial NFC stage. This reduces usability (though the credential may be cached on the mobile) and adds administrative overhead (password need to established and kept fresh etc.) but increases security.

Further, with systems and methods herein, the MFD need not offer its own onboard access point. The mobile device is also able to connect through another access point (say, a general access point for the host network) with wired access to the MFD, which may then deny wired network access until the connecting client supplies a credential. A mobile device can first establish such a credential over NFC in a similar manner to the process described above, then supply such a credential when making a WiFi→Access Point→Wired→MFD connection. In this scenario, physical proximity is required for any use by a mobile device joining the network over an access point. This can be combined with a process whereby regular devices connected to the network have such a credential pre-configured and do not require the generation of a credential via NFC. In this way only the WiFi connected mobiles would require physical proximity to acquire a credential over NFC.

The devices and methods herein use the physical placement of the mobile on the NFC chip on the MFD so that the user is physically present at the MFD device. As the Wi-Fi is turned off when not in use, the MFD device is not at risk when waiting for users to walk up. When in use, the SSID need not be broadcast, so it cannot be read from the list of advertised SSIDs in the local area. Since the SSID is randomized, it cannot be guessed. And even if it was, the randomly generated password for the chosen WiFi security protocol cannot be guessed.

The devices and methods herein can be restricted to allowing only one user to connect to the MFD at any point of time via wireless, because the configuration can be randomly created for that one-time use, thereby reducing the risk of multiple users connecting to the MFD. Alternatively, multiple configurations could be used simultaneously. Thus, embodiments where only one user is allowed to connect at a time gives the user some assurance that he or she is not connecting to a network from which other connected users may attack his or her mobile.

The embodiments herein are substantially user friendly because the user can just tap on the MFD to get access to it and avoid the problems of searching through the list of SSIDs to find the correct one (there is less confusion to other users also, who will not see SSIDs of MFDs they do not care about when making some other WiFi connection). User friendliness extends because the user is not required to determine and entering a network password and other protocol details to secure the connection.

The Wi-Fi is turned off and is not broadcasting and it significantly saves power compared to the solution when the Wi-Fi is turned on always. The lease expiry turns it off and saves power. In addition, the MFD may choose to leave its access point powered on but simply not broadcast it SSID until paired with the mobile device, opting to ignore the power saving benefits of turning it off. Further, turning the Wi-Fi off when not in use reduces the possibility of interference with other wireless devices in the same frequency range. This is especially useful in scenarios where many WiFi access points are in competition with each other.

Figure 4:
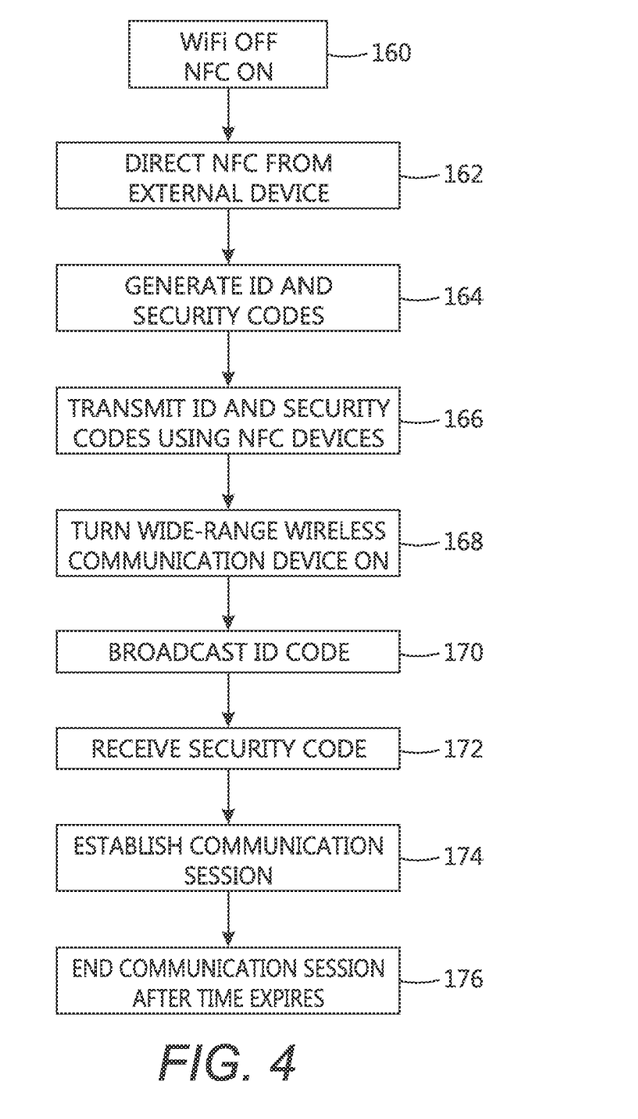
FIG. 4 is a flow diagram illustrating various method embodiments herein.

FIG. 4 is flowchart illustrating an exemplary method herein. In item 160, this exemplary method maintains (using a processor of an apparatus) a "wide-range" wireless communication device of the apparatus (such as a WiFi or Bluetooth device) in an inactive state ("off" or non-receiving, non-transmitting state) and a "near field" wireless communication device (such as an NFC transceiver) of the apparatus in an active state ("on" state) when no communications are received from any external devices (that are external to the apparatus).

The near field wireless communication device and the wide-range wireless communication device use different communication mediums. Such different communication mediums can include a radio-based communication medium, an optical-based communication medium, an induction field-based communication medium, a sound-based communication medium, etc.

Thus, for example, the near field wireless communication device can communicate by electromagnetic induction communication. Near Field Communication Technology (referred to as NFC) is a communication protocol that uses electromagnetic induction (in, for example, a 13.56-Hz frequency band). NFC is used for close-range communication with relatively low speed. In some systems, for example, the maximum range of communication can be approximately 10 cm. This standard is defined by NFC IP-1 (ISO/IEC18092) and NFC IP-2 (ISO/IEC214841).

To the contrary, the apparatus wide-range wireless communication device can communicate using a different communication medium, such as by radio frequency communication. For example Wi-Fi (Wireless Fidelity) is a name commonly used to represent wireless Local Area Network (LAN) communication based on the Institute of Electrical and Electronics Engineers' (IEEE) 802.11 standards. Like Bluetooth, Wi-Fi is a Radio Frequency (RF) communication technology. In a typical Wi-Fi environment, one or more electronic devices communicate with a wireless router or access point, where the router or access point is physically connected by wire to a Wide Area Network (WAN) and/or the Internet. Computers or other electronic devices wishing to wirelessly communicate with the access point must be within range of the RF signal, and if security has been implemented on the router or access point, connecting devices must also know and share an encryption key in order to be admitted.

While a limited number of near field and wide-range communication systems have been mentioned above, those ordinarily skilled in the art would understand that any communication systems and devices (so long as they are different) whether currently known or developed in the future could be used as the near field and wide-range communication systems with embodiments herein.

The apparatus may be connected to a computerized network, but an external computerized device may not be connected to the computerized network, and communications will need to be established between the two. Therefore, in item 162 this exemplary method detects a near field communication (NFC) from a near field wireless communication device of the external computerized device, using the apparatus near field wireless communication device. The apparatus and the external computerized device operate under a coordinated set of communication protocol instructions stored in non-transitory storage mediums of the apparatus and the external computerized device.

As mentioned above, the apparatus near field wireless communication device and the external device near field wireless communication device may be able to only communicate over distances less than 1 meter. For example, the detection of the NFC from the external device near field wireless communication device may only occur when the external computerized device is positioned within 0.1 meter of the apparatus near field wireless communication device. Such distances can be different based on the power of the equipment used. To the contrary, the apparatus wide-range wireless communication device and the external device wide-range wireless communication device can communicate over distances less than and greater than 1 meter.

Based on detecting the NFC from the external computerized device (and based on the coordinated set of communication protocol instructions) in item 164 this exemplary method generates random identification and security codes using the processor. The identification code is the wireless network name the wide-range wireless communication device will recognize, and the security code is the code required to join that wireless network. Each is changed for each successive communication session.

Thus, different identification codes and different security codes are generated for each different network communication session, making each different identification code and each different the security code unique for each the different network communication session. Different communication sessions are formed between the apparatus and each different external device. Each network communication session is based on the coordinated set of communication protocol instructions.

In item 166, the apparatus transmits the identification code and the security code from the apparatus near field wireless communication device to the device near field wireless communication device. Also, in item 168, the processor turns on and maintains the apparatus wide-range wireless communication device in an active state using the processor. The inactive state of the apparatus wide-range wireless communication device can be a non-transmitting/receiving state and/or a powered-down state. The active state of the apparatus wide-range wireless communication device is a powered-on state where the apparatus wide-range wireless communication device receives communications made using the identification code as the network name. Therefore, in item 170, the apparatus wide-range wireless communication device receives communications made using the identification code as the network name so that the external device can locate the apparatus.

In response, in item 172, the method receives the security code transmitted from the wide-range wireless communication device of the external computerized device (based on the coordinated set of communication protocol instructions) using the apparatus wide-range wireless communication device. Then, in item 174, the method establishes a network communication session only between the external computerized device and the apparatus, using only the apparatus wide-range wireless communication device and the external device wide-range wireless communication device, based on receiving the security code and based on the coordinated set of communication protocol instructions (using the processor).

As shown in item 176, the method can also set a time limit (lease period) for the network communication session and the processor terminates the network communication session based on the time limit expiring, requiring the external computerized device to form a new network communication session.

Figure 5:
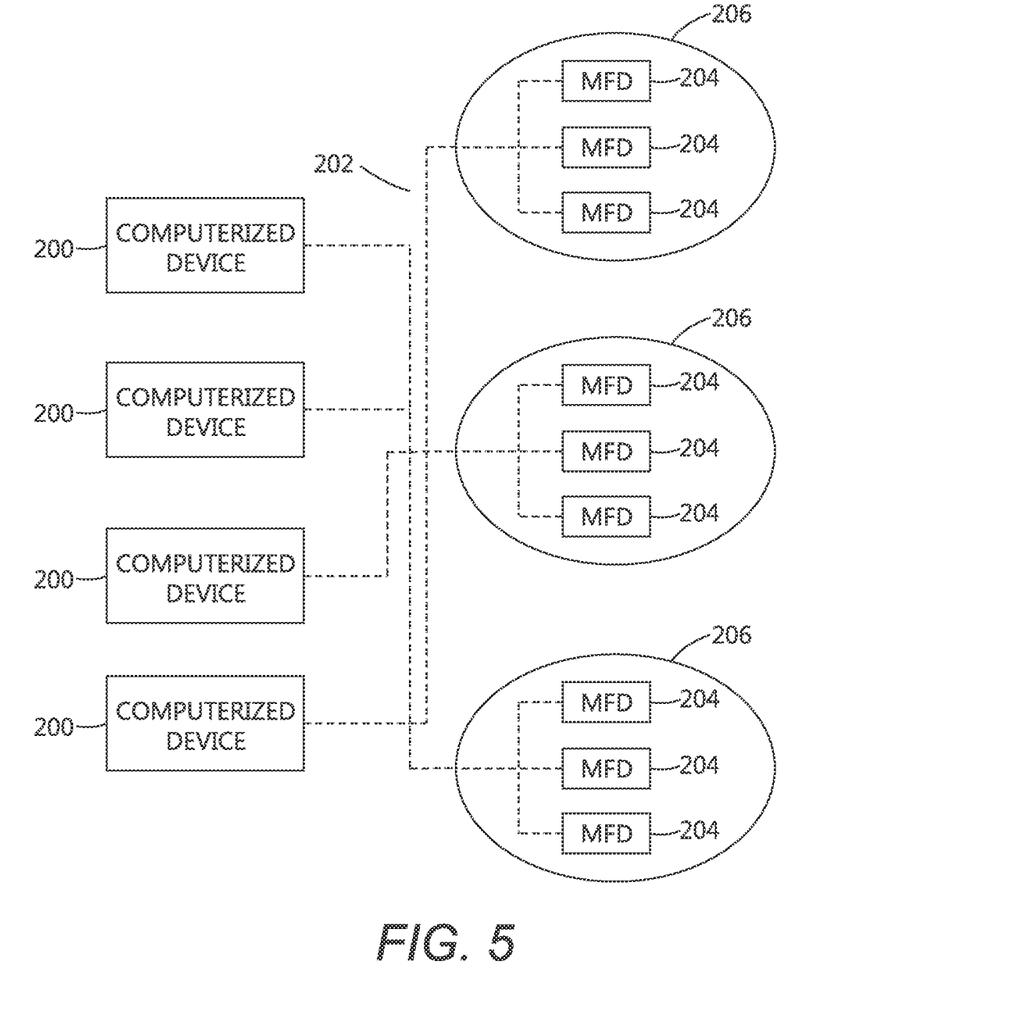
FIG. 5 is a schematic diagram of a device according to embodiments herein.

As shown in FIG. 5, exemplary system embodiments herein include various computerized devices 200, 204 located at various different physical locations 206. The computerized devices 200, 204 can include portable computing device, smart phone, personal digital assistant (PDA), print servers, printing devices, personal computers, etc., and can be in communication (operatively connected to one another) by way of a local area wireless network 202 (shown using dashed lines in FIG. 5).

Figure 6:
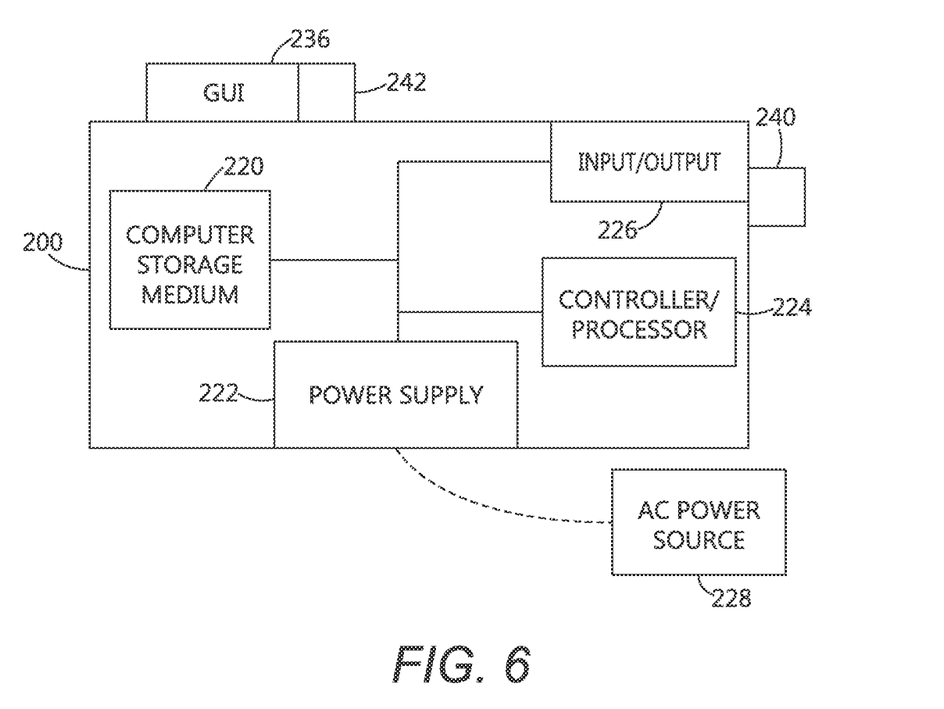
FIG. 6 is a schematic diagram of a device according to embodiments herein.

FIG. 6 illustrates a computerized device 200, which can be used with embodiments herein and can comprise, for example, a print server, a personal computer, a portable computing device, smart phone, personal digital assistant (PDA), etc. The computerized device 200 includes a controller/processor 224 and a communications port (input/output) 226 operatively connected to the processor 224 and to the computerized network 202 external to the computerized device 200. Also, the computerized device 200 can include at least one accessory functional component, such as a graphic user interface assembly 236 that also operate on the power supplied from the external power source 228 (through the power supply 222).

The input/output device 226 is used for communications to and from the computerized device 200. The processor 224 controls the various actions of the computerized device. A non-transitory computer storage medium device 220 (which can be optical, magnetic, capacitor based, etc.) is readable by the processor 224 and stores instructions that the processor 224 executes to allow the computerized device to perform its various functions, such as those described herein. Thus, as shown in FIG. 6, a body housing 200 has one or more functional components that operate on power supplied from the alternating current (AC) 228 by the power supply 222. The power supply 222 can comprise a power storage element (e.g., a battery) and connects to an external alternating current power source 228 and converts the external power into the type of power needed by the various components.

Figure 7:
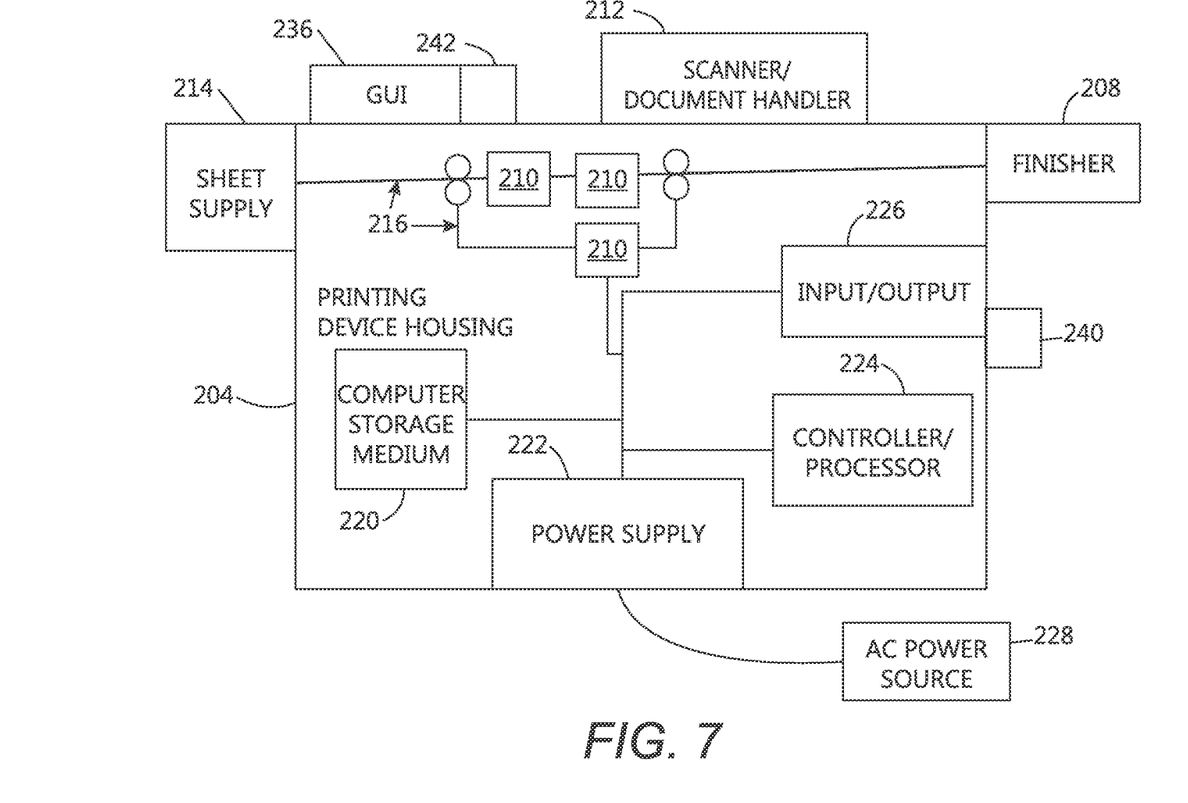
FIG. 7 is a schematic diagram of a device according to embodiments herein.

FIG. 7 illustrates a computerized device that is a printing device 204, which can be used with embodiments herein and can comprise, for example, a printer, copier, multi-function machine, multi-function device (MFD), etc. The printing device 204 includes many of the components mentioned above and at least one marking device (printing engines) 210 operatively connected to the processor 224, a media path 216 positioned to supply sheets of media from a sheet supply 214 to the marking device(s) 210, etc. After receiving various markings from the printing engine(s), the sheets of media can optionally pass to a finisher 208 which can fold, staple, sort, etc., the various printed sheets. Also, the printing device 204 can include at least one accessory functional component (such as a scanner/document handler 212, etc.) that also operate on the power supplied from the external power source 228 (through the power supply 222).

In FIGS. 6 and 7, an apparatus near field wireless communication device 242 is operatively connected to the processor 224. Further, such a device can include an apparatus wide-range wireless communication device 240 operatively connected to the processor 224. The apparatus near field wireless communication device 242 and the apparatus wide-range wireless communication device 240 use different communication mediums. The processor 224 maintains the apparatus wide-range wireless communication device 240 in an inactive state (off or at least not transmitting or receiving) and the apparatus near field wireless communication device 242 in an active state where there are no communications received from any external devices (that are external to the apparatus 200, 204).

The apparatus near field wireless communication device 242 detects a near field communication (NFC) from an external device near field wireless communication device of an external computerized device. The apparatus (200, 204, etc.) and the external computerized device (200, 204, etc.) operate under a coordinated set of communication protocol instructions stored in respective non-transitory storage mediums 220 of the apparatus and the external computerized device.

Based on the detection of the NFC from the external computerized device (and based on the coordinated set of communication protocol instructions) the processor 224 generates random identification and security codes, transmits the identification code and the security code from the apparatus near field wireless communication device 242 to the device near field wireless communication device, maintains the apparatus wide-range wireless communication device 240 in an active state, and sets the apparatus wide-range wireless communication device 240 to receive the identification code. The active state of the apparatus wide-range wireless communication device 240 set in this process is a state where the apparatus wide-range wireless communication device 240 receives communications made using the identification code.

The apparatus wide-range wireless communication device 240 then receives the security code from an external device wide-range wireless communication device 240 of the external computerized device (that is based on the coordinated set of communication protocol instructions). This allows the processor 224 to establish a network communication session only between the external computerized device 200 and the apparatus (using only the apparatus wide-range wireless communication device 240 and the external device wide-range wireless communication device 240) based on the receipt of the security code and based on the coordinated set of communication protocol instructions.

Different identification codes and different the security codes are generated for each different network communication session between the apparatus 204 and different ones of the external devices 200, based on the coordinated set of communication protocol instructions, making each different identification code and each different the security code unique for each the different network communication session. The processor 224 can also set a time limit for the network communication session and the processor 224 terminates the network communication session when the time limit expires.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock, Tex., USA and Apple Computer Co., Cupertino, Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art. The embodiments herein can encompass embodiments that print in color, monochrome, or handle color or monochrome image data. All foregoing embodiments are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the embodiments herein cannot be implied or imported from any above example as limitations to any particular order, number, position, size, shape, angle, color, or material.

What is claimed is:

1. An apparatus comprising:
a processor;
an apparatus near field wireless communication device operatively connected to said processor; and
an apparatus wide-range wireless communication device operatively connected to said processor,
said apparatus near field wireless communication device and said apparatus wide-range wireless communication device using different communication mediums,
said processor maintaining said apparatus wide-range wireless communication device in an inactive state and said apparatus near field wireless communication device in an active state based on no communications being received from external devices that are external to said apparatus,
said apparatus near field wireless communication device detecting a near field communication (NFC) from an external device near field wireless communication device of an external computerized device,
based on said detecting of said NFC from said external computerized device, said processor:
generating a random identification code and a random security code;
transmitting said identification code and said security code from said apparatus near field wireless communication device to said device near field wireless communication device; and
maintaining said apparatus wide-range wireless communication device in an active state,
said apparatus wide-range wireless communication device receiving said security code from an external device wide-range wireless communication device of said external computerized device,
said processor establishing a network communication session only between said external computerized device and said apparatus using only said apparatus wide-range wireless communication device and said external device wide-range wireless communication device, based on said receiving of said security code, and
said generating of said identification code and said security code comprising generating different identification codes and different said security codes for each different network communication session between said apparatus and different ones of said external devices, making each different identification code and each different said security code unique for each said different network communication session.

2. The apparatus according to claim 1, said inactive state of said apparatus wide-range wireless communication device comprising a powered-down state, and
said active state of said apparatus wide-range wireless communication device comprising a state where said apparatus wide-range wireless communication device receives communications made using said identification code.

3. The apparatus according to claim 1, said processor setting a time limit for said network communication session and said processor terminating said network communication session based on said time limit expiring.

4. The apparatus according to claim 1, said apparatus being connected to a first computerized network, and
said external computerized device not being connected to said first computerized network.

5. The apparatus according to claim 1, said apparatus near field wireless communication device and said external device near field wireless communication device communicating only over distances less than 1 meter, and said apparatus wide-range wireless communication device and said external device wide-range wireless communication device communicating over distances less than and greater than 1 meter.

6. The apparatus according to claim 1, said detecting said NFC from said external device near field wireless communication device occurring only by said external computerized device being positioned within 0.1 meter of said apparatus near field wireless communication device.

7. A printing apparatus comprising:
a processor;
an apparatus near field wireless communication device operatively connected to said processor; and
an apparatus wide-range wireless communication device operatively connected to said processor,
said apparatus near field wireless communication device and said apparatus wide-range wireless communication device using different communication mediums,
said processor maintaining said apparatus wide-range wireless communication device in an inactive state and said apparatus near field wireless communication device in an active state based on no communications being received from external devices that are external to said apparatus,
said apparatus near field wireless communication device detecting a near field communication (NFC) from an external device near field wireless communication device of an external computerized device,
said apparatus and said external computerized device operating under a coordinated set of communication protocol instructions stored in non-transitory storage mediums of said apparatus and said external computerized device,
based on said detecting of said NFC from said external computerized device and said coordinated set of communication protocol instructions, said processor:
generating a random identification code and a random security code;
transmitting said identification code and said security code from said apparatus near field wireless communication device to said device near field wireless communication device; and
maintaining said apparatus wide-range wireless communication device in an active state,
said apparatus wide-range wireless communication device receiving said security code from an external device wide-range wireless communication device of said external computerized device based on said coordinated set of communication protocol instructions,
said processor establishing a network communication session only between said external computerized device and said apparatus using only said apparatus wide-range wireless communication device and said external device wide-range wireless communication device, based on said receiving of said security code and based on said coordinated set of communication protocol instructions, and
said generating of said identification code and said security code comprising generating different identification codes and different said security codes for each different network communication session between said apparatus and different ones of said external devices, based on said coordinated set of communication protocol instructions, making each different identification code and each different said security code unique for each said different network communication session.

8. The apparatus according to claim 7, said inactive state of said apparatus wide-range wireless communication device comprising a powered-down state, and
said active state of said apparatus wide-range wireless communication device comprising a state where said apparatus wide-range wireless communication device receives communications made using said identification code.

9. The apparatus according to claim 7, said processor setting a time limit for said network communication session and said processor terminating said network communication session based on said time limit expiring.

10. The apparatus according to claim 7, said apparatus being connected to a first computerized network, and
said external computerized device not being connected to said first computerized network.

11. The apparatus according to claim 7, said apparatus near field wireless communication device and said external device near field wireless communication device communicating only over distances less than 1 meter, and
said apparatus wide-range wireless communication device and said external device wide-range wireless communication device communicating over distances less than and greater than 1 meter.

12. The apparatus according to claim 7, said detecting said NFC from said external device near field wireless communication device occurring only by said external computerized device being positioned within 0.1 meter of said apparatus near field wireless communication device.

13. A method comprising:
maintaining, using a processor of an apparatus, an apparatus wide-range wireless communication device of said apparatus in an inactive state and an apparatus near field wireless communication device of said apparatus in an active state based on no communications being received from external devices that are external to said apparatus, said apparatus near field wireless communication device and said apparatus wide-range wireless communication device using different communication mediums,
detecting a near field communication (NFC) from an external device near field wireless communication device of an external computerized device using said apparatus near field wireless communication device,
based on said detecting of said NFC from said external computerized device:
generating a random identification code and a random security code using said processor;
transmitting said identification code and said security code from said apparatus near field wireless communication device to said device near field wireless communication device; and
maintaining said apparatus wide-range wireless communication device in an active state using said processor;
receiving said security code from an external device wide-range wireless communication device of said external computerized device using said apparatus wide-range wireless communication device; and
establishing a network communication session only between said external computerized device and said apparatus using only said apparatus wide-range wireless communication device and said external device wide-range wireless communication device, based on said receiving of said security code, using said processor,
said generating of said identification code and said security code comprising generating different identification codes and different said security codes for each different network communication session between said apparatus and different ones of said external devices, making each different identification code and each different said security code unique for each said different network communication session.

14. The method according to claim 13, said inactive state of said apparatus wide-range wireless communication device comprising a powered-down state, and said active state of said apparatus wide-range wireless communication device comprising a state where said apparatus wide-range wireless communication device receives communications made using said identification code.

15. The method according to claim 13, further comprising setting a time limit for said network communication session and terminating said network communication session based on said time limit expiring, using said processor.

16. The method according to claim 13, said apparatus being connected to a first computerized network, and said external computerized device not being connected to said first computerized network.

17. The method according to claim 13, said apparatus near field wireless communication device and said external device near field wireless communication device communicating only over distances less than 1 meter, and said apparatus wide-range wireless communication device and said external device wide-range wireless communication device communicating over distances less than and greater than 1 meter.

18. The method according to claim 13, said detecting said NFC from said external device near field wireless communication device occurring only by said external computerized device being positioned within 0.1 meter of said apparatus near field wireless communication device.

19. A method comprising:

maintaining, using a processor of an apparatus, an apparatus wide-range wireless communication device of said apparatus in an inactive state and an apparatus near field wireless communication device of said apparatus in an active state based on no communications being received from external devices that are external to said apparatus, said apparatus near field wireless communication device and said apparatus wide-range wireless communication device using different communication mediums, detecting a near field communication (NFC) from an external device near field wireless communication device of an external computerized device using said apparatus near field wireless communication device, said apparatus and said external computerized device operating under a coordinated set of communication protocol instructions stored in non-transitory storage mediums of said apparatus and said external computerized device, based on said detecting of said NFC from said external computerized device and said coordinated set of communication protocol instructions:

generating a random identification code and a random security code using said processor;

transmitting said identification code and said security code from said apparatus near field wireless communication device to said device near field wireless communication device; and maintaining said apparatus wide-range wireless communication device in an active state using said processor;

receiving said security code from an external device wide-range wireless communication device of said external computerized device based on said coordinated set of communication protocol instructions using said apparatus wide-range wireless communication device; and establishing a network communication session only between said external computerized device and said apparatus using only said apparatus wide-range wireless communication device and said external device wide-range wireless communication device, based on said receiving of said security code and based on said coordinated set of communication protocol instructions, using said processor, said generating of said identification code and said security code comprising generating different identification codes and different said security codes for each different network communication session between said apparatus and different ones of said external devices, based on said coordinated set of communication protocol instructions, making each different identification code and each different said security code unique for each said different network communication session.

20. The method according to claim 19, said inactive state of said apparatus wide-range wireless communication device comprising a powered-down state, and said active state of said apparatus wide-range wireless communication device comprising a state where said apparatus wide-range wireless communication device receives communications made using said identification code.

21. The method according to claim 19, further comprising setting a time limit for said network communication session and terminating said network communication session based on said time limit expiring, using said processor.

22. The method according to claim 19, said apparatus being connected to a first computerized network, and said external computerized device not being connected to said first computerized network.

23. The method according to claim 19, said apparatus near field wireless communication device and said external device near field wireless communication device communicating only over distances less than 1 meter, and said apparatus wide-range wireless communication device and said external device wide-range wireless communication device communicating over distances less than and greater than 1 meter.

24. The method according to claim 19, said detecting said NFC from said external device near field wireless communication device occurring only by said external computerized device being positioned within 0.1 meter of said apparatus near field wireless communication device.

* * * * *